(12) United States Patent
Foskey et al.

(10) Patent No.: US 11,208,204 B2
(45) Date of Patent: Dec. 28, 2021

(54) ROTORCRAFT ELASTOMERIC BEARING ASSEMBLY

(71) Applicant: Bell Helicopter Textron Inc., Fort Worth, TX (US)

(72) Inventors: Christopher E. Foskey, Keller, TX (US); Michael J. Southerland, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/815,482

(22) Filed: Nov. 16, 2017

(65) Prior Publication Data

US 2018/0072409 A1 Mar. 15, 2018

Related U.S. Application Data

(63) Continuation of application No. 14/630,382, filed on Feb. 24, 2015, now Pat. No. 9,873,507.

(60) Provisional application No. 61/944,978, filed on Feb. 26, 2014.

(51) Int. Cl.
  *B64C 27/35* (2006.01)
  *B64C 11/04* (2006.01)
  *B64C 29/00* (2006.01)
  *B64C 27/00* (2006.01)
  *F16F 1/38* (2006.01)

(52) U.S. Cl.
  CPC ............. *B64C 27/35* (2013.01); *B64C 11/04* (2013.01); *B64C 29/0033* (2013.01); *B64C 27/001* (2013.01); *F16F 1/38* (2013.01)

(58) Field of Classification Search
  CPC ....... B64C 11/04; B64C 27/001; B64C 27/32; B64C 27/322; B64C 27/33; B64C 27/35; B64C 27/39; B64C 27/48; B64C 27/51; B64C 29/0033; B64C 2027/003; F16F 1/38
  See application file for complete search history.

(56) References Cited

U.S. PATENT DOCUMENTS 3,556,673 A * 1/1971 Killian .................... B64C 27/35
                                                  416/134 R
3,566,673 A * 3/1971 Kogan ..................... G01N 7/02
                                                     422/93

(Continued)

*Primary Examiner* — Courtney D Heinle
*Assistant Examiner* — Sang K Kim
(74) *Attorney, Agent, or Firm* — Lightfoot & Alford PLLC

(57) ABSTRACT

In some embodiments, a rotorcraft may include a yoke, a blade, a spindle associated with the yoke, and an elastomeric bearing assembly. The center length of the spindle may define a center axis that passes through a center of the elastomeric bearing assembly. The elastomeric bearing assembly may contain a housing coupled to the blade and disposed around the center axis that is configured to rotate in relation to the center axis. The elastomeric bearing assembly may contain an elastomeric shear bearing that has an interior portion coupled to the spindle and an exterior portion coupled to the housing. The elastomeric bearing assembly may contain an elastomeric centrifugal force bearing pressed against the housing. The shear bearing may be configured to counteract a torsional force, and the centrifugal force bearing may be configured to counteract a compression force.

18 Claims, 9 Drawing Sheets

(56) References Cited

U.S. PATENT DOCUMENTS

| | | | | |
|---|---|---|---|---|
| 3,764,230 A * | 10/1973 | Rybicki | .................. | B64C 27/32 |
| | | | | 416/134 A |
| 3,790,302 A * | 2/1974 | Pascher | .................. | B64C 27/35 |
| | | | | 416/134 R |
| 3,807,896 A * | 4/1974 | Johnson | .................. | B64C 27/35 |
| | | | | 416/102 |
| 5,499,903 A * | 3/1996 | Schmaling | ............. | B64C 27/35 |
| | | | | 416/134 A |
| 7,290,985 B2 * | 11/2007 | James | .................... | B64C 27/56 |
| | | | | 416/1 |
| 2011/0243731 A1 * | 10/2011 | Meyer | .................... | B64C 27/35 |
| | | | | 416/1 |
| 2011/0274548 A1 * | 11/2011 | Stamps | .................. | B64C 27/33 |
| | | | | 416/174 |

* cited by examiner

ROTORCRAFT ELASTOMERIC BEARING ASSEMBLY

BACKGROUND

Technical Field

This present disclosure relates generally to an elastomeric bearing assembly for rotorcraft.

Description of Related Art

Typically, the centrifugal force motions and the feathering motions experienced by the blade of a rotorcraft are managed by discrete bearings mounted within separate components. These separate components are generally heavy and complex. Hence, there is a need for an improved device for managing both the centrifugal force and feathering motions in a rotorcraft.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
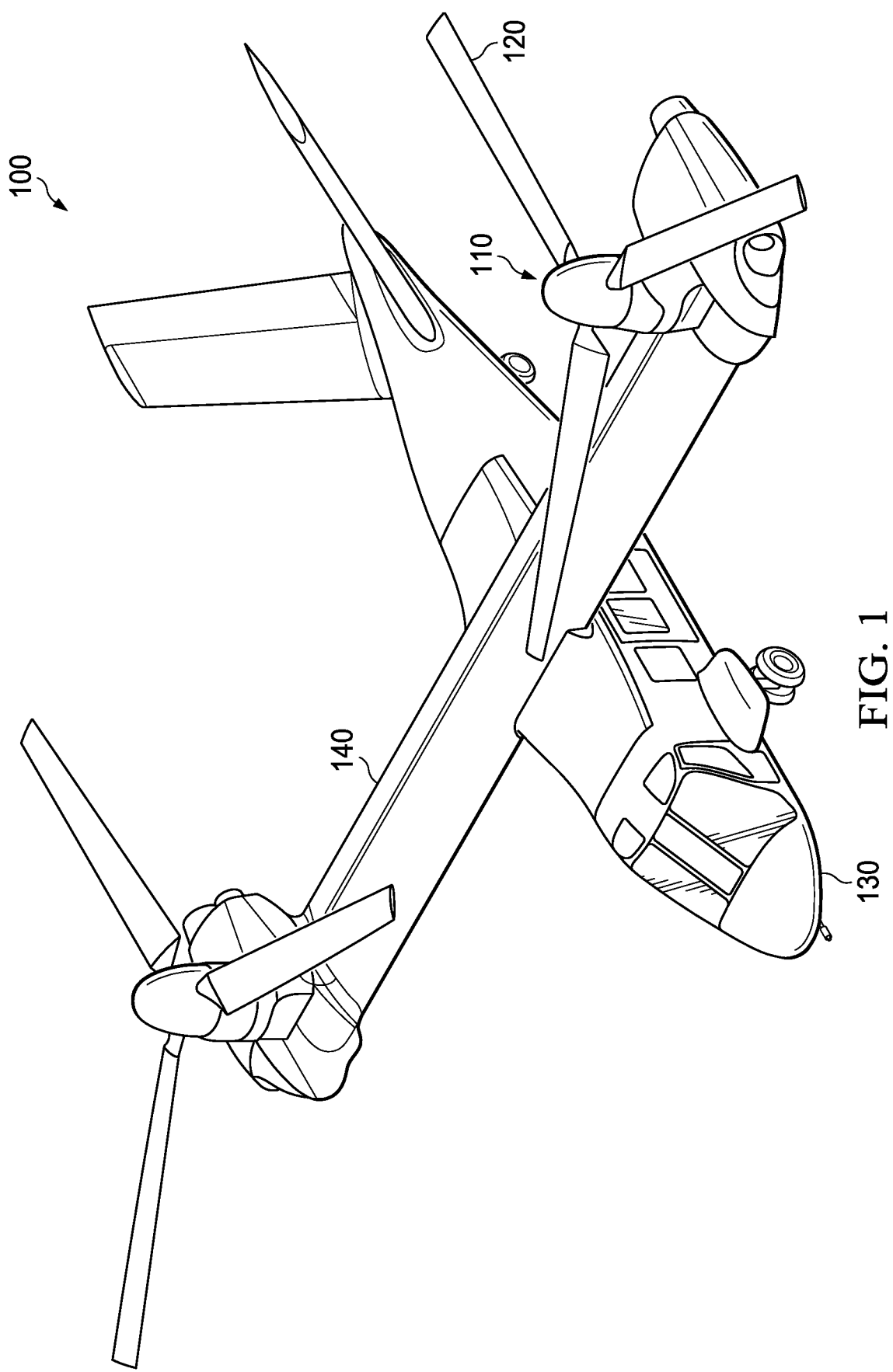
FIG. 1 is a perspective view of a rotorcraft, according to an example embodiment.

FIG. 1 shows a rotorcraft 100 according to one example embodiment. Rotorcraft 100 features one or more rotor systems 110, a fuselage 130, and a wing 140. Rotor system 110 can include blades 120, a control system, and a pitch horn 160 for selectively controlling the pitch of each blade 120 in order to control direction, thrust, and lift of rotorcraft 100. In the example of FIG. 1, rotorcraft 100 represents a tiltrotor aircraft, and rotor system 110 features rotatable nacelles. In this example, the position of the nacelles operate rotorcraft 100 in both helicopter and airplane modes. Fuselage 130 represents the main body of rotorcraft 100 and can be coupled to one or more rotor systems 110 (e.g., via wing 140) such that rotor system 110 can provide thrust to move fuselage 130 through the air. Wing 140 can also generate lift during forward flight.

Figure 2:
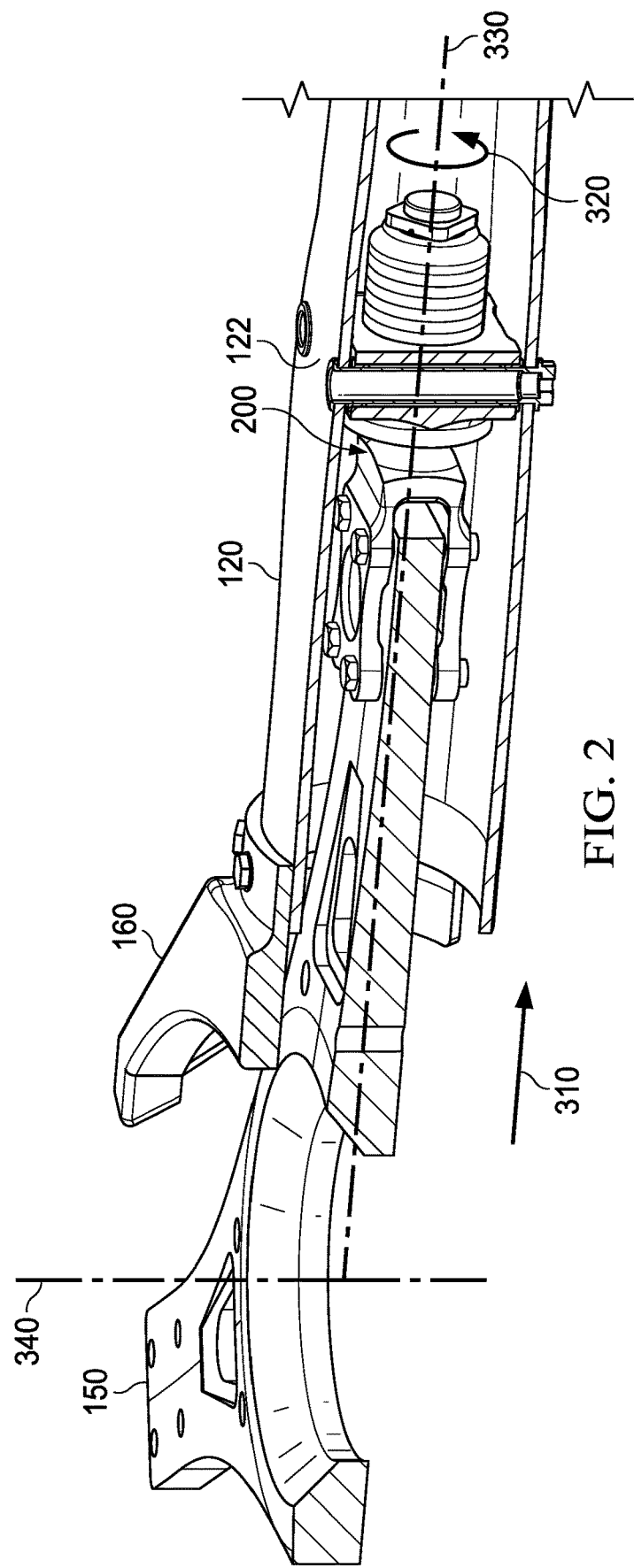
FIG. 2 is a perspective section view of a rotor system of a rotorcraft, according to an example embodiment.
Figure 3:
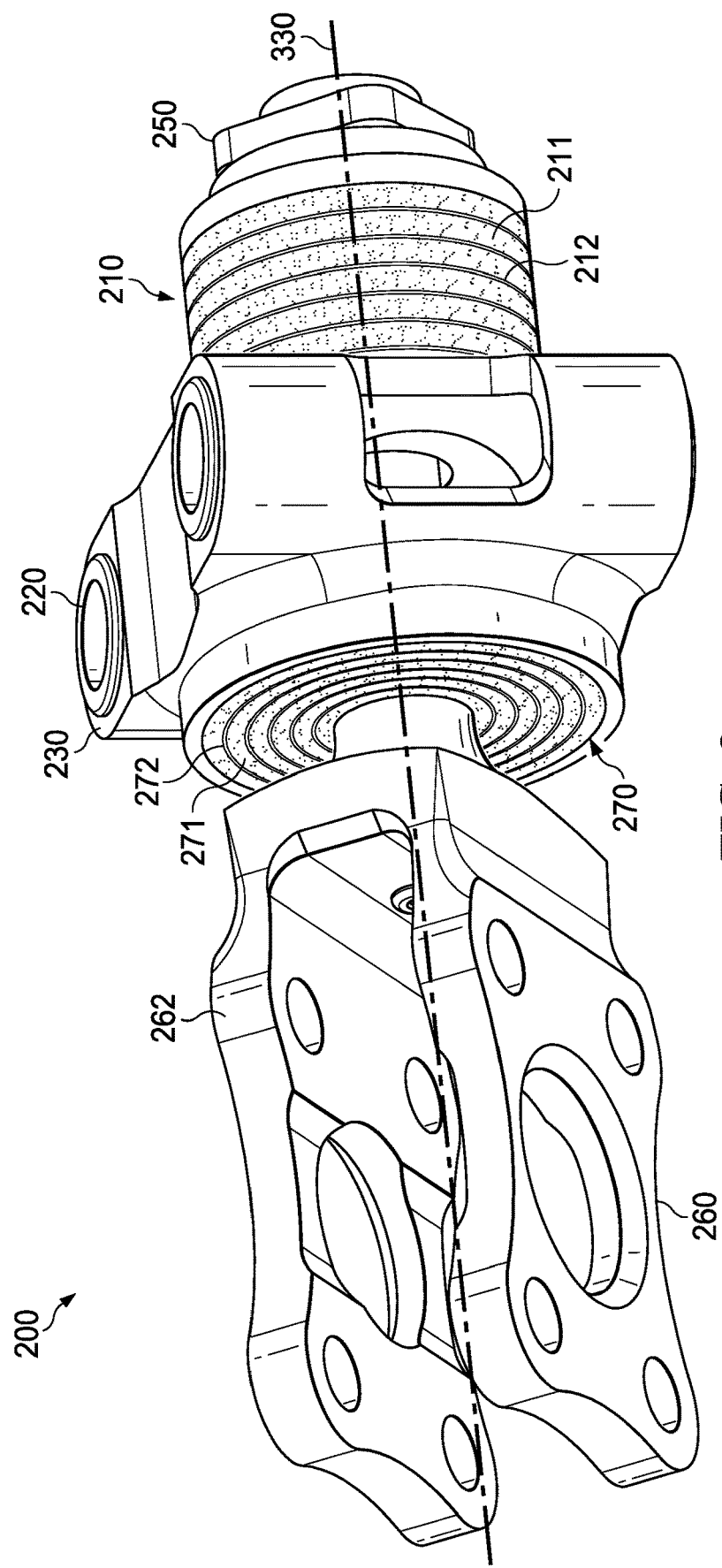
FIG. 3 is a perspective view of an elastomeric bearing assembly, according to an example embodiment.
Figure 4:
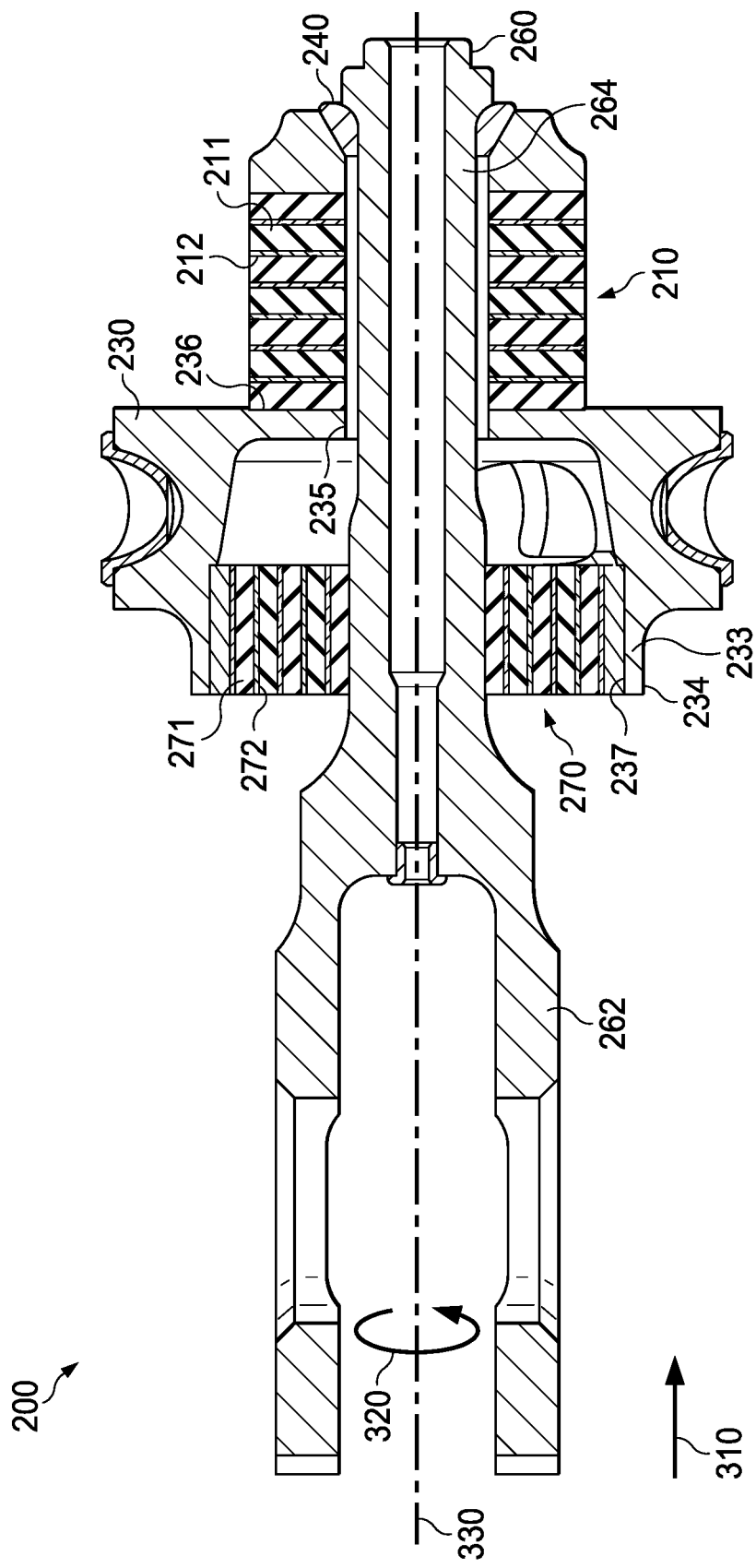
FIG. 4 is a side section view of an elastomeric bearing assembly, according to an example embodiment.
Figure 5:
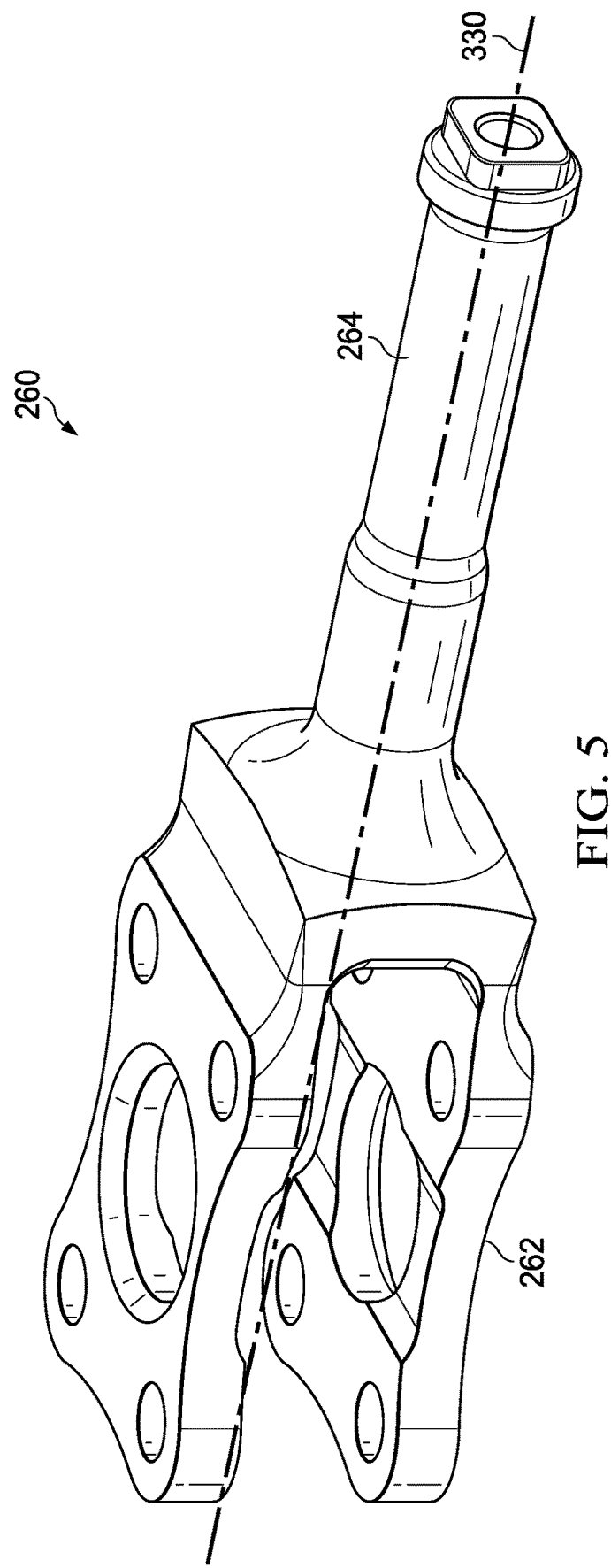
FIG. 5 is a perspective view of a spindle, according to an example embodiment.

Referring now to FIG. 2, a propulsion system provides torque to a rotor mast (not shown). Yoke 150 is coupled to the rotor mast such that rotation of the rotor mast causes yoke 150 and rotor blade 120 to rotate about the rotor mast axis 340 of rotation. Each yoke 150 further includes at least one elastomeric bearing assembly 200 for receiving and coupling to each rotor blade 120. Elastomeric bearing assembly 200 can be configured to treat and react a plurality of dynamic forces, such as centrifugal force 310 and torsional force 320, that act on blade 120. In one example, elastomeric bearing assembly 200 is located completely within a cavity of the blade.

Referring now to FIGS. 3 through 7, elastomeric bearing assembly 200 may include a spindle 260, a housing 230, a shear bearing 270, a centrifugal force bearing 210, a cone set 240, and a cap 250. Outboard portion 264 of spindle 260 can pass through the center of shear bearing 270, housing 230, centrifugal force bearing 210, and cap 250. Centrifugal force bearing 210 can be vulcanized to the outboard end of housing 230 and held in place by cone set 240, which can be two separate pieces that form a cone shape, and cap 250.

Spindle 260 can be fabricated out of any suitable material. For example, spindle 260 can be forged, cast, or machined out of a suitable material such as stainless steel or titanium. The inboard portion 262 of spindle 260 can be attached to yoke 150 by four bolts and the outboard portion 264 of spindle 260 can be rigidly coupled to cap 250. In another example embodiment, spindle 260 and yoke 150 can be one piece where the spindle is an outer portion of yoke 150.

Figure 7:
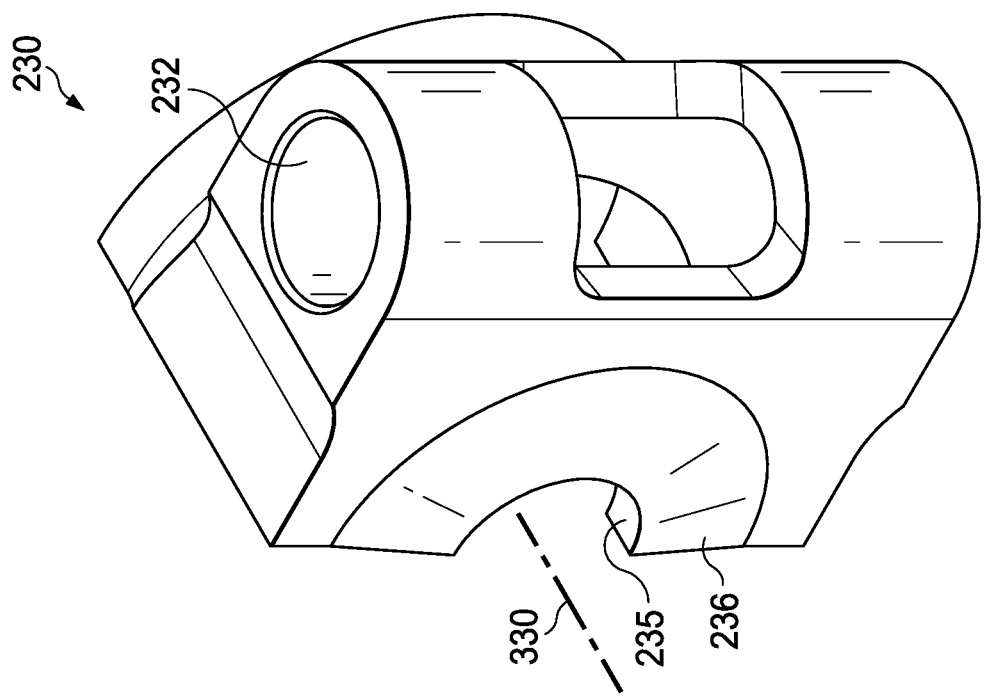
FIG. 7 is a perspective section view of an outboard side of a housing of an elastomeric bearing assembly, according to an example embodiment.
Figure 6:
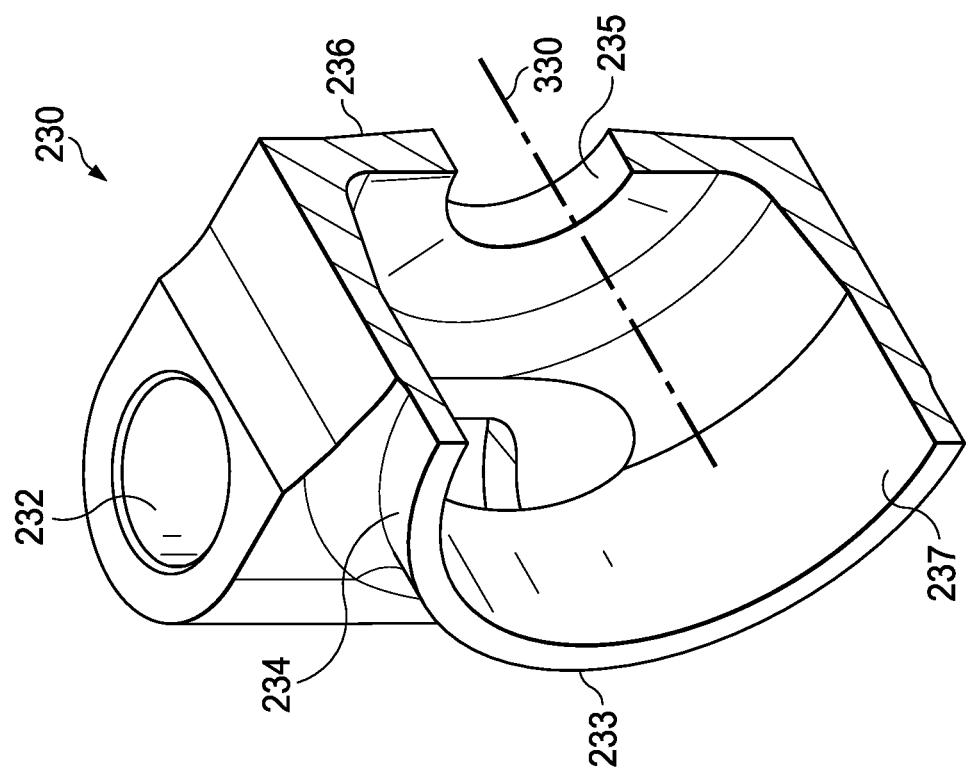
FIG. 6 is a perspective section view of an inboard side of a housing of an elastomeric bearing assembly, according to an example embodiment.

Housing 230 can be fabricated out of any suitable material. For example, housing 230 can be forged, cast, or machined out of a suitable material such as stainless steel or titanium. On the inboard end of housing 230, a first cavity with interior wall portion 237 can accommodate shear bearing 270. The first cavity can have substantially the same diameter as the exterior diameter of shear bearing 270. As best seen in FIGS. 6 and 7, wall 233 may provide support for the first cavity and can also have an exterior wall portion 234 that can be of a similar shape as shear bearing 270. Wall 233 can be of a suitable thickness, depending on the size of shear bearing 270. For example, if the diameter of shear bearing 270 is 5.5 inches, a suitable thickness of wall 233 may be 0.5 inches. On the outboard end of housing 230, a second cavity with interior wall portion 235 can accommodate outboard portion 264 of spindle 260 passing through housing 230.

On the sides of housing 230, two cavities 232 that are perpendicular to spindle 260, but parallel to each other, can accommodate bushings 220 and blade bolts configured to couple a flat portion of blade 120 to housing 230. Cavity 232 can be outboard of spindle bearing 270 but inboard of centrifugal force bearing 210.

In one embodiment, shear bearing 270 is a cylindrical elastomeric bearing which has multiple cylindrical layers that are laminated or vulcanized together. In another embodiment, shear bearing 270 may have conical or spherical layers that are laminated or vulcanized together. Shear bearing 270 can include alternating elastomeric layers 271 and rigid layers 272. Elastomeric layers 271 may be made of an elastic material such as rubber, and rigid layers 272 may be made of a rigid material such as steel. However, embodiments are not limited to any particular materials, and elastomeric layers 271 and rigid layers 272 may be made of any elastic and rigid materials, respectively.

Shear bearing 270 can be vulcanized or adhered to both the outboard portion 264 of spindle 260 and wall portion 237 of housing 230. Shear bearing 270 can be configured such that housing 230 is allowed to rotate clockwise and counterclockwise about a center axis 330 that runs along the length of each blade 120 and spindle 260. For example, shear bearing 270 reacts to torsional force 320 by elastically deforming the cylindrical elastomeric layers between each rigid layer. As mentioned, pitch horn 160 can selectively control the pitch of blade 120. Therefore, as pitch horn 160 rotates blade 120, torsional force 320 is transferred from blade 120 to housing 230, from housing 230 to shear bearing 270. Accordingly, since spindle 260 is not rotatable, torsional force 320 is in relation to spindle 260.

In one embodiment, centrifugal force bearing 210 is a cylindrical elastomeric bearing which has multiple substantially planar layers that are laminated or vulcanized together. In another embodiment, centrifugal force bearing 210 may have conical or spherical layers that are laminated or vulcanized together. The planar layers may run perpendicularly in relation to the length of spindle 260. Centrifugal force bearing 210 can include alternating elastomeric layers 211 and rigid layers 212. Elastomeric layers 211 may be made of an elastic material such as rubber, and rigid layers 212 may be made of a rigid material such as steel. However, embodiments are not limited to any particular materials, and elastomeric layers and rigid layers may be made of any elastic and rigid materials, respectively.

Centrifugal force bearing 210 can be vulcanized or adhered to surface 236 of housing 230. Centrifugal force bearing 210 can be configured to counteract centrifugal forces acting on blade 120 as blade 120 spins around yoke 150. For example, centrifugal forces acting on blade 120 are transferred from blade 120 to housing 230, housing 230 then exerts a compression force to centrifugal force bearing 210. Centrifugal force bearing 210 reacts and counteracts the compression force by compressing the elastomeric layers between each rigid layer.

In one example embodiment, centrifugal force bearing 210 may not be cylindrical. Those skilled in the art will understand that centrifugal force bearing 210 may be deviated from being cylindrical. For example, centrifugal force bearing 210 may be cube shaped.

Figure 8:
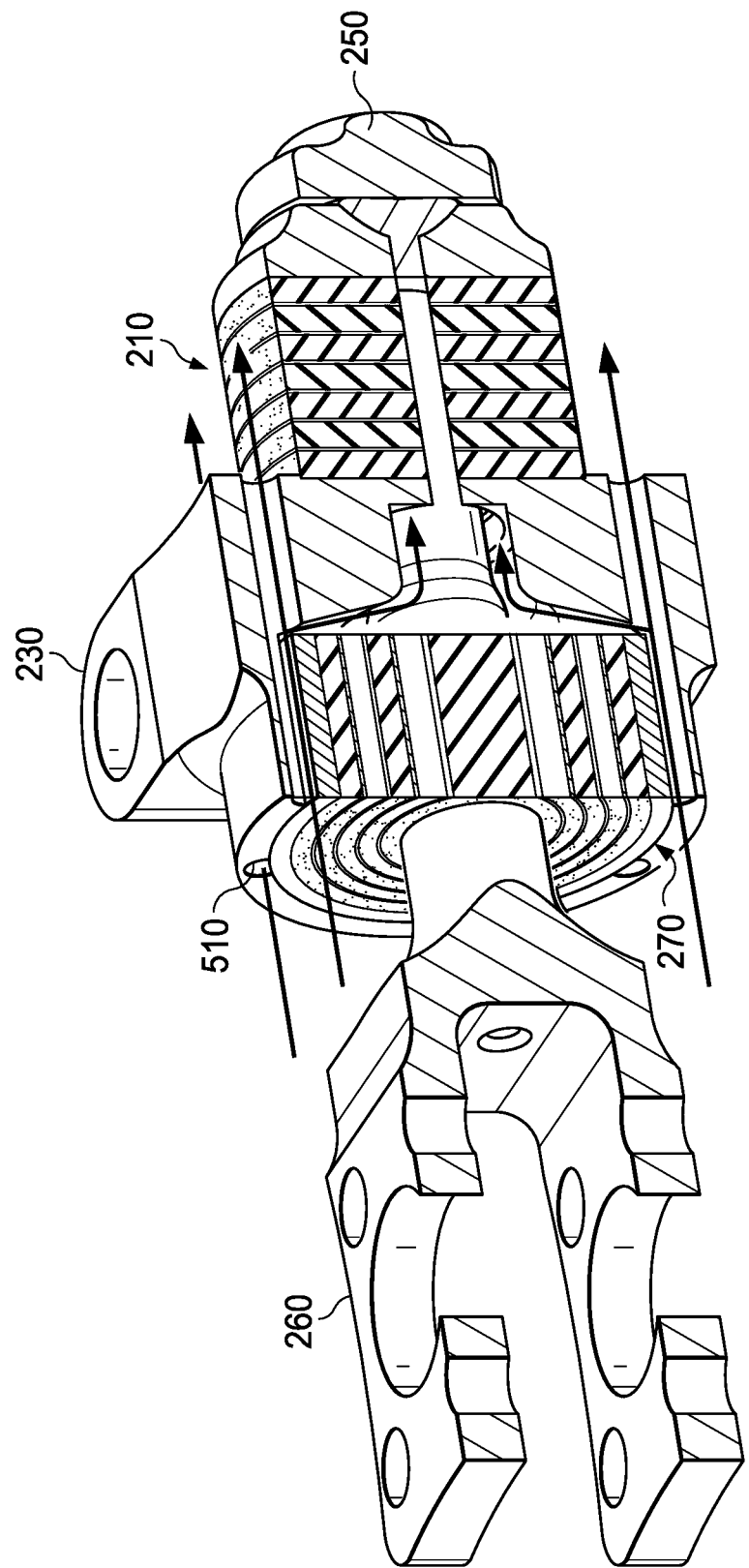
FIG. 8 is a perspective section view of an elastomeric bearing assembly, according to an example embodiment.

In one example embodiment, housing 230 includes a plurality of apertures 510 running parallel to spindle 260, as seen in FIG. 8. These apertures can serve several purposes. For example, apertures 510 may make it easier to remove shear bearing 270 from the assembly. Specialized tooling can be made to fit within apertures 510 and pull shear bearing 270 away from housing 230. Another purpose of apertures 510 is to allow air to flow into apertures 510 in order to cool the elements of elastomeric bearing assembly 200. During operation, centrifugal force bearing 210 and shear bearing 270 can be repeatedly compressed or twisted due to the compression and torsional forces acting on them. These forces can produce excess heat that can be reduced by apertures 510.

Figure 9:
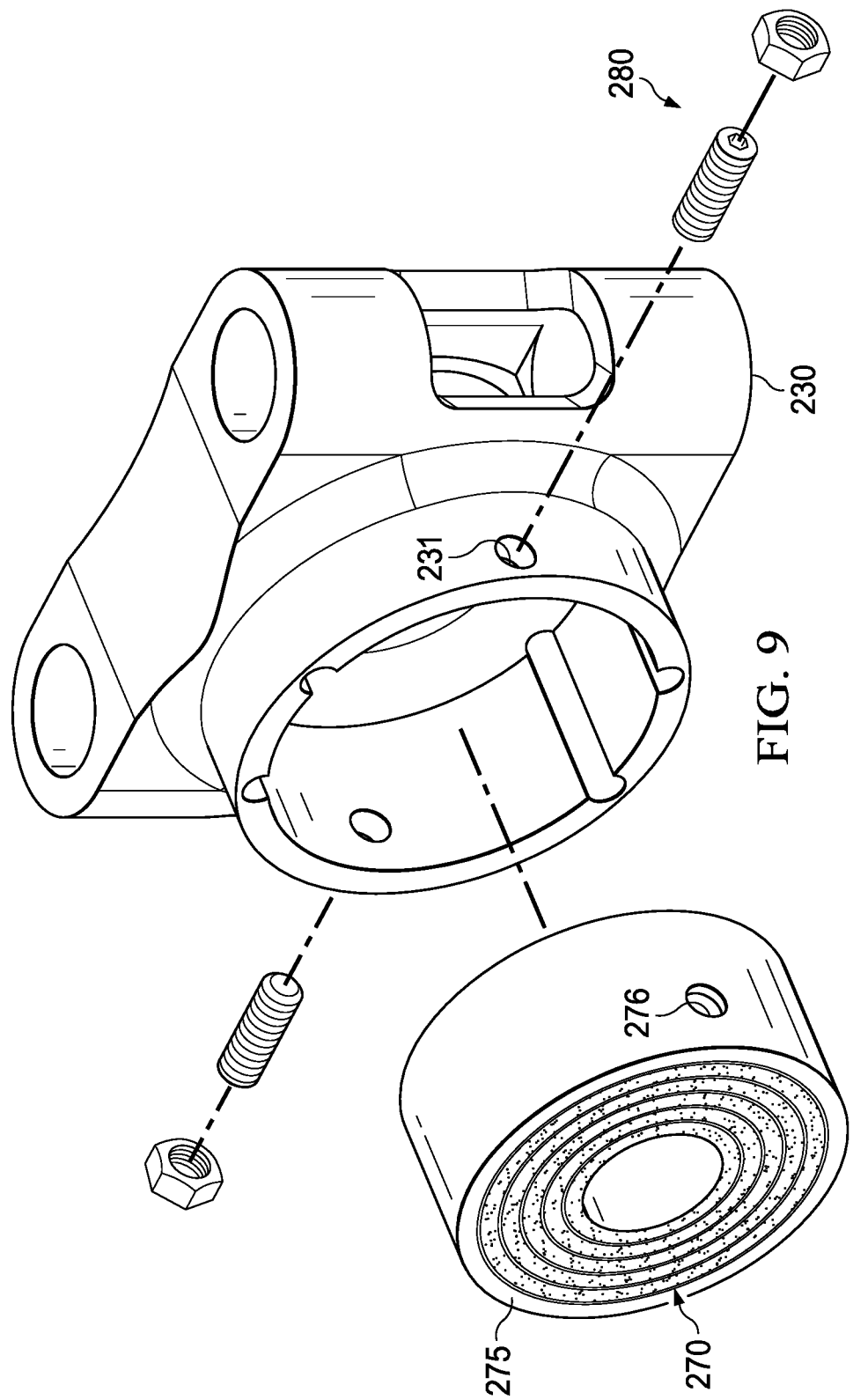
FIG. 9 is a partially exploded perspective view of an elastomeric bearing assembly, according to an example embodiment.
Figure 10:
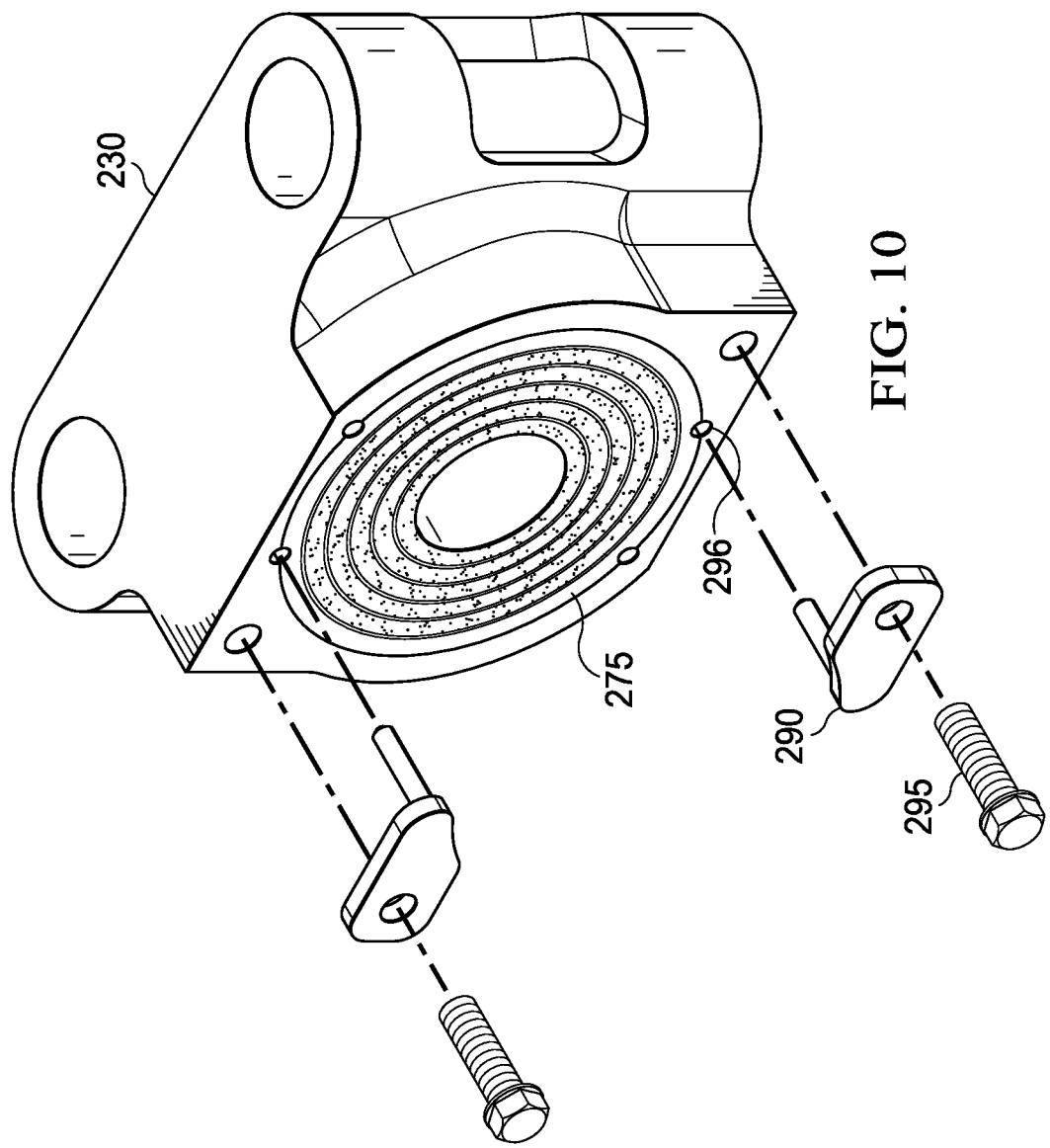
FIG. 10 is a partially exploded perspective view of an elastomeric bearing assembly, according to an example embodiment.

In one example embodiment, shear bearing 270 may include a race 275, as seen in FIGS. 9 and 10. Race 275 can be made out of any suitable metal, such as stainless steel. The outermost layer of shear bearing 270 can be vulcanized or adhered to race 275. Shear bearing 270 with race 275 can be wet installed, bonded, or thermally fit into housing 230. One of the advantages of this embodiment is that shear bearing 270 can be easily removed from housing 230 and replaced with a lower risk of damaging the centrifugal force bearing 210.

In yet another example embodiment, shear bearing 270 may include additional anti-rotation features when shear bearing 270 is bonded to race 275 instead of housing 230. As seen in FIG. 9, race 275 may include holes 276, and housing 230 may include holes 235 that may run transversely in relation to shear bearing 270. Holes 235 and 276 may accommodate locked set screws 280 that run through housing 230 and race 275. In another example embodiment, race 275 and housing 230 may include holes 296 that run parallel to race 275, as seen in FIG. 10. Holes 296 can accommodate pinned plates 290 that are secured to housing 230 by screws 295.

One advantage of elastomeric bearing assembly 200 is that both shear bearing 270 and centrifugal force bearing 210 are located in the same assembly. Having both of these bearings in the same assembly makes the assembly more compact and lightweight. Additionally, the design of elastomeric bearing assembly 200 can allow the assembly to be closer to the center of gravity of the rotor system, which can reduce the forces acting on elastomeric bearing assembly 200 and blade 120.

Another advantage of elastomeric bearing assembly 200 is that cavities 232, which accommodate bushings 220 and the blade bolts, are located close to center axis 330, and close to each other. A person of skill in the art would recognize that a flat portion 122 of blade 120 is the optimal position for the blade bolts to couple elastomeric bearing assembly 200 to blade 120. Hence, locating the blade bolts closer to center axis 330 and each other would reduce the width of the flat portion 122 of blade 120. The reduction of the width of flat portion 122 of blade 120 may reduce manufacturing complexity and cost.

For example, if cavities 232 were to exceed a specific width apart, the spar of blade 120 may become equally wide at that location; therefore, the final blade structure may not be dynamically acceptable for certain applications, such as tiltrotor aircraft. A person of skill in the art would recognize that the blades of tiltrotor aircraft are especially sensitive to structural dynamic tuning.

The particular embodiments disclosed above are illustrative only, as the system may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotor system for a rotorcraft, the rotor system comprising:
   a yoke;
   a blade; and
   a spindle associated with the yoke, wherein the center length of the spindle defines a center axis that passes through a center of an elastomeric bearing assembly, wherein the elastomeric bearing assembly comprises:
      a housing disposed around the center axis, the housing configured to rotate about the center axis, the housing directly coupled to the blade;
      an elastomeric shear bearing, wherein an interior portion of the shear bearing is coupled to the spindle and an exterior portion of the shear bearing is coupled to the housing, the shear bearing configured to counteract a torsional force; and
      an elastomeric centrifugal force bearing pressed against the housing, the centrifugal force bearing configured to counteract a compression force
   wherein the elastomeric bearing assembly is disposed to longitudinally overlap a portion of the blade;
   wherein the elastomeric shear bearing is located inboard relative to the centrifugal force bearing; and
   wherein the elastomeric bearing assembly is located completely within a cavity of the blade.

2. The rotor system of claim 1, wherein the housing comprises a first bolt hole and a second bolt hole, each comprising an opening that is on a plane that is outboard of the shear bearing and inboard of the centrifugal force bearing.

3. The rotor system of claim 1, wherein the shear bearing has a plurality of cylindrical alternating elastomeric layers and rigid layers.

4. The rotor system of claim 1, wherein the centrifugal force bearing has a plurality of alternating elastomeric layers and rigid layers.

5. The rotor system of claim 1, wherein the elastomeric bearing assembly comprises a cap pressed against the centrifugal force bearing, the cap being coupled to the spindle.

6. The rotor system of claim 5, wherein the centrifugal force bearing is located between the housing and the cap.

7. The rotor system of claim 1, wherein the elastomeric bearing assembly has an axial aperture configured to allow a pin to be disposed within to prevent a rotation of the shear bearing.

8. The rotor system of claim 1, wherein the housing comprises an aperture that extends through the housing.

9. The rotor system of claim 1, wherein the housing is directly coupled to the blade with a bushing and a bolt.

10. An elastomeric bearing assembly for a rotorcraft, the elastomeric bearing assembly comprising:
    a housing disposed around a center axis, the housing configured to rotate about the center axis and configured to be directly coupled to a rotorcraft blade;
    an elastomeric shear bearing, wherein an exterior portion of the shear bearing is coupled to the housing, the shear bearing configured to counteract a torsional force created by the rotation of the housing; and
    an elastomeric centrifugal force bearing pressed against the housing, the centrifugal force bearing configured to counteract a compression force along the center axis;
    wherein the elastomeric bearing assembly is disposed to longitudinally overlap a portion of the rotorcraft blade;
    wherein the elastomeric shear bearing is located inboard relative to the centrifugal force bearing; and
    wherein the elastomeric bearing assembly is located completely within a cavity of the blade.

11. The elastomeric bearing of claim 10, wherein the housing comprises a first bolt hole and a second bolt hole, each bolt hole comprising an opening that is on a plane that is located between the shear bearing and the centrifugal force bearing.

12. The elastomeric bearing of claim 10, wherein the shear bearing has a plurality of alternating elastomeric layers and rigid layers.

13. The elastomeric bearing of claim 12, wherein the plurality of alternating elastomeric layers and rigid layers are cylindrical.

14. The elastomeric bearing of claim 10, wherein the centrifugal force bearing has a plurality of alternating elastomeric layers and rigid layers.

15. The elastomeric bearing of claim 12, wherein the plurality of alternating elastomeric layers and rigid layers are planar.

16. The elastomeric bearing of claim 10, wherein the elastomeric bearing assembly has an aperture configured to allow a pin to be disposed within to prevent a rotation of the shear bearing.

17. The elastomeric bearing of claim 10, wherein the housing comprises an aperture that extends through the housing.

18. The elastomeric bearing of claim 10, wherein the housing is configured to be directly coupled to the rotorcraft blade via a bolt.

* * * * *